Aug. 6, 1957   J. J. J. STAUNTON   2,802,174
NULL INDICATOR FOR pH METER
Filed April 20, 1951   2 Sheets-Sheet 1
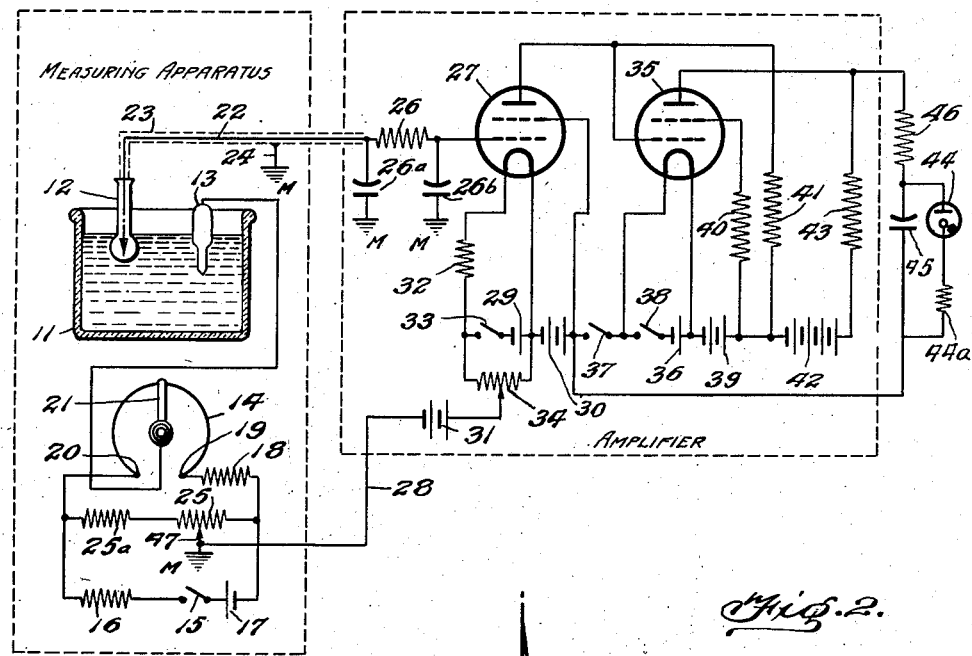
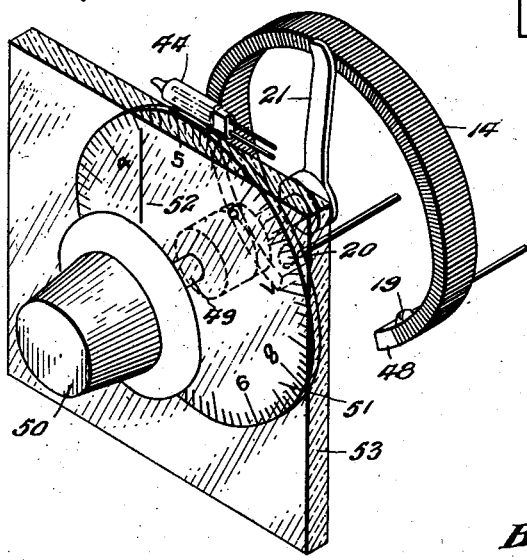
Inventor
John J. J. Staunton
By McCanna and Morsbach
Attorneys Aug. 6, 1957  J. J. J. STAUNTON  2,802,174
NULL INDICATOR FOR pH METER
Filed April 20, 1951  2 Sheets-Sheet 2
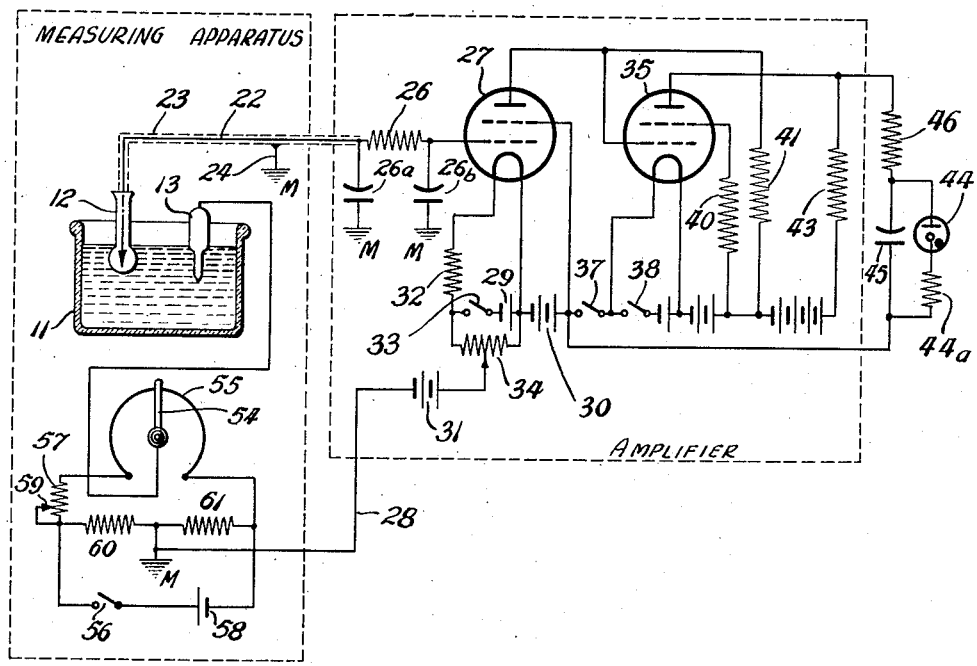
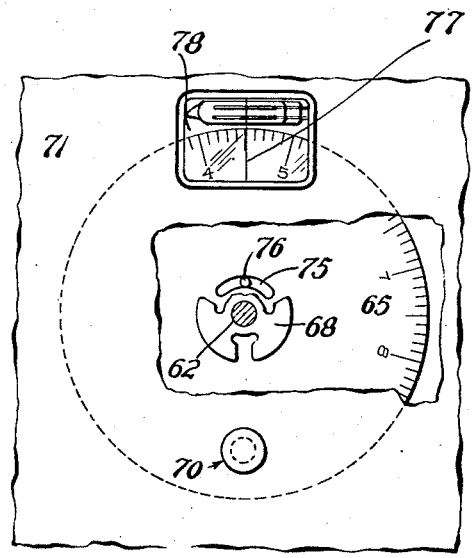
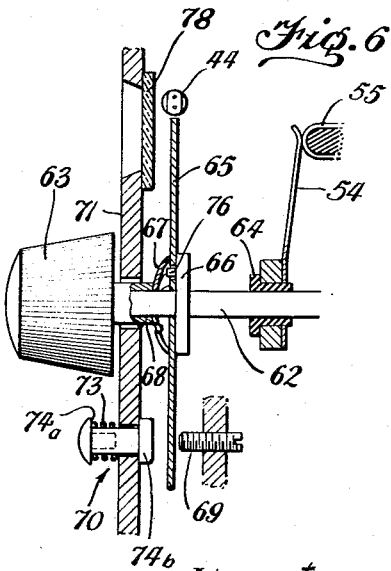
Inventor
John J. J. Staunton
By McCanna and Morsbach
Attorneys United States Patent Office 2,802,174
Patented Aug. 6, 1957

2,802,174

NULL INDICATOR FOR pH METER

John J. J. Staunton, Oak Park, Ill., assignor to Coleman Instruments, Inc., Maywood, Ill., a corporation of Illinois Application April 20, 1951, Serial No. 222,019

12 Claims. (Cl. 324—30)

This invention relates to a null indicator for indicating small voltages and more particularly to an instrument for measuring pH which employs such a null indicator.

An object of this invention is to provide a novel null indicator for indicating when a direct current voltage is above or below a desired value.

Another object of this invention is to provide a pH meter having a null indicator which is at all times coupled to the test cell and to the balancing potentiometer so as to give a continuous indication of the condition of balance between the test cell and the potentiometer.

Another object of this invention is to provide a null indicator for a pH meter which is so mounted as to be readily apparent to the operator at all times.

It is also an object of this invention to provide a single control for a pH meter which combines in a unified manner the adjustment for the potentiometer for balancing out the potential due to the hydrogen ion concentration of the solution and the means for compensating for the asymmetry potential of the glass electrode of the test cell.

Another object of this invention is to provide a pH meter having a null indicator in which a single unitary control initially adjusts the indicator to the null condition and also compensates for the asymmetry potential of the glass electrode of the test cell.

A further object of this invention is to provide a pH meter in which no additional means for standardizing the potentiometer, other than the battery for energizing the potentiometer, is required.

A still further object of this invention is to provide an extremely stable amplifier for greatly amplifying the output voltage from the pH measuring instrument to actuate an indicator.

It is also an object of this invention to provide a precision pH meter of reduced size and of greater simplicity in use.

Likewise it is an object of this invention to provide in a pH meter a novel temperature compensator.

Other and further objects and advantages of the invention will be apparent from the following description of preferred embodiments thereof.

Figure 1 is a circuit diagram illustrating the essential components of one form of the present invention;

Fig. 2 is a performance curve illustrating the current and voltage relationships in the neon tube which forms a part of my novel null indicator;

Fig. 3 is a perspective view illustrating the mounting of the null indicator tube at the potentiometer of the pH measuring instrument in the system of Figure 1;

Fig. 4 is a circuit diagram illustrating the essential components of another preferred embodiment of the present invention;

Fig. 5 is a plan view illustrating the combined assembly of the null indicator, the potentiometer of the pH measuring instrument of Figure 1, and the asymmetry potential adjuster for the pH instrument, with part of the top of the casing which encloses these elements being removed, and Fig. 6 is a vertical sectional view of the Fig. 5 apparatus, illustrating the constructional details thereof.

In accordance with the present invention there is provided a pH instrument for determining the hydrogen ion concentration of a solution. The solution is contained in a vessel 11. A glass electrode, generally indicated at 12, and a reference electrode 13 are immersed in the solution in electrically cooperative relation. Both the glass electrode and the reference electrode are shown only schematically herein and may have the structural form of the respective electrodes shown in Coleman Patent No. 2,311,977, or may take the form of other electrode constructions known in the art. A slide wire potentiometer 14 is provided for balancing out the potential due to the hydrogen ion concentration to be measured in the test cell. As shown in Figure 1, the potentiometer 14 is supplied through normally closed switch 15 and fixed resistance 16 with a voltage from battery 17. A fixed resistance 18 is connected between one of the terminals 19 of potentiometer 14 and the battery 17, while the other end 20 of the potentiometer is connected to the side of resistor 16 remote from the battery. A slider 21 on the potentiometer is directly connected to the reference electrode 13 of the test cell. As is well known in the art, the glass electrode 12 is provided with a lead 22 which is surrounded by a shield 23, the shield being connected by a conductor 24 to what is commonly called a McClure ground. One end 19 of the potentiometer is also connected to the McClure ground through resistors 18 and 25. Another resistor 25a is in series with resistor 25 across the energizing circuit of battery 17, switch 15 and resistor 16. In one embodiment of the measuring apparatus the following values of the circuit elements have been used successfully: battery 17 has a voltage of 1.35 volts, potentiometer 14 has a total resistance of 1000 ohms, resistor 18 is 195 ohms, resistor 25 is 1000 ohms, resistor 25a is 2,070 ohms, and resistor 16 is 393 ohms.

In operation, with switch 15 closed the potentiometer 14 has a potential between slider 21 and an end of the potentiometer 19 which is opposite in sense to the potential developed by the test cell, including reference electrode 13 and the glass electrode 12 and lead 22. Thus, to measure the potential of the test cell it is only necessary to adjust slider 21 on the potentiometer 14 so that these opposed potentials balance each other out. When this occurs there is no difference of potential between conductor 22 and the end 19 of the potentiometer. For indicating when these potentials are balanced out there is provided a novel null indicator, which forms an essential part of the present invention.

The null indicator circuit includes an amplifier which amplifies the current from the measuring apparatus and a relaxation oscillator serving as the null indicator. From Figure 1 it will be seen that the shielded conductor 22 from the glass electrode 12 of the test cell is coupled, by means of a resistor 26 and condensers 26a and 26b, connected as shown, to the control grid of the electrometer tube 27. The cathode of the electrometer is coupled through a conductor 28 to the end 19 of the slide wire. The battery assembly for the electrometer tube 27 consists of three units, one being the filament battery 29 of 1.3 volts, the second being the screen grid battery 30 having a voltage of about 5.4 volts, and thirdly, the control grid battery 31 of about four volts. A small resistor 32, in this instance having a value of 22 ohms, and a switch 33 are connected between the filament and battery 29. A resistor 34, having a value of about 2000 ohms, is connected across the filament to couple the filament to the potentiometer 14 by means of an adjustable tap on resistor 34, control grid bias battery 31, and conductor 28. The control grid voltage on the electrometer tube 27 is maintained at all times more negative than 2½ volts, this being the approximate floating point of the electrometer tube 27 under the conditions existing in this measuring instrument.

The second stage of the amplifier includes a tube 35, operating as a voltage amplifier, whose control grid is directly coupled to the plate of electrometer tube 27. This stage of the amplifier is provided with a filament battery 36 of 1.3 volts and switches 37 and 38 connected as shown. The control grid bias of the second tube is approximately minus 1.7 volts. In a particular amplifier used successively with the measuring apparatus already specified, battery 39 has a voltage of 30 volts, screen grid resistor 40 is 1.5 megohms, plate resistor 41 for the first stage of the amplifier is 33 megohms, plate battery 42 is 90 volts, and the plate resistor 43 of the second stage is 1 megohm.

The output current from the plate of tube 35 is fed to my novel null indicator, presently to be described. The overall amplification factor of the amplifier is about 5000. In use with the null indicator according to the present invention, the amplifier may be swung so far that the plate voltage on the second tube 35 covers the entire possible range from zero to approximately the voltage of the plate supply battery (39 and 42). However, it is not possible to damage the amplifier by overswinging it in this manner because the grid impedances in both stages are sufficiently high to prevent the grids from drawing excessive grid current, even though they are swung positive.

All of the switches 15, 33, 37 and 38 are coupled together for unitary control thereover, switch 33 being the last to open, and switch 15 being the next to last to open, when it is desired to de-energize the pH measuring instrument.

All of the batteries used in the measuring apparatus and in the amplifier, except batteries 39 and 42, are preferably of the mercury cell type, such as shown in U. S. Patent 2,422,045 to Samuel Ruben, and improvements thereon shown in later patents to the same inventor. These mercury cells are advantageous in the present invention because of the extremely constant voltage they produce when the current drain is low, as in the present circuit. The current drain of the indicator is about 40 microamperes at balance and never exceeds 100 microamperes. The current drains for the plate and screen grid, respectively, of the first stage of the amplifier are of the order of 1 microampere anod ½ microampere. Accordingly, mercury cell batteries 30 and 31 last their shelf life. The other batteries last three to six months in ordinary service. Batteries 39 and 42 are small hearing aid batteries which ban be used because of the very low current drain of the amplifier, never in excess of 100 microamperes.

In the present invention it is unnecessary to employ the usual standardized cell for precisely determining the potential on potentiometer 14 because of the constancy of mercury cell 17 which energizes the potentiometer. This results in a significant reduction in the bulk and expense of the pH meter.

Also, because all of the batteries in the present invention are of the same type, any variations in the control grid and screen grid biases of the tubes, due to temperature variations or other errors in the cells, will balance out. Thus, the amplifier is very stable, which characteristic, along with its high gain, renders it particularly adapted for use with the present novel null indicator, and for use with a pH measuring apparatus whose current output is low.

Both amplifier tubes are preferably of the sub-miniature type, which, along with the small size of the mercury cells, makes the pH meter according to the present invention of considerably smaller size than any of the commercial pH meters presently available without detracting from the precision of the instrument.

The indicator includes a conventional relaxation oscillator connected to the output of the second tube of the amplifier. As is evident from Figure 1, the relaxation oscillator includes a series combination of buffer resistor 44a and a tube 44 containing an ionizable gas, such as neon, connected in parallel with a capacitor 45, the parallel combination being in series with a resistor 46 of approximately 1 megohm, the entire combination of resistors, capacitor and neon tube being connected across the output of the second stage of the amplifier. In considering the operation of the relaxation oscillator as a null indicator, it is to be noted that a current through resistor 46 builds up a charge on capacitor 45 until the voltage difference between the plates of the capacitor exceeds the ignition voltage of the neon tube. When this happens current flows between the electrodes of the neon tube and the charge on the capacitor flows through the low impedance path provided by the neon tube to ultimately reduce the voltage across the plates of the capacitor. The neon tube has a characteristic as shown in Fig. 2, such that as current I starts to flow through the tube the voltage difference E between the electrodes of the neon tube drops to some minimum value $E_{min}$ and then rises slightly as the current through the tube increases. As the capacitor 45 discharges, the voltage across its plates decreases, approaching the voltage difference between the electrodes of the gas tube, so that current through the gas tube decreases. Thus, in accordance with the tube characteristic shown in Fig. 2, as the tube current decreases (moving to the left along the abscissa) the tube voltage E will drop slightly until it reaches a minimum $E_{min}$ at a small value of the tube current. As the tube current is further decreased, in response to decreasing voltage across the capacitor, the tube voltage rises in accordance with the characteristic shown in Fig. 2. At some point, $E_x$, during this portion of the discharge of the capacitor the voltage supplied by it to the neon tube will drop below the voltage across the electrodes of the neon tube required to maintain a current in the tube, and therefore the tube will be extinguished. After this happens, the cycle of charging the condenser and discharging the condenser through the neon tube is repeated. The frequency of this cycle, i. e., the periodic lighting of the neon tube, depends upon several factors: (1) the values of resistor 46 and capacitor 45 in the circuits; (2) the design of the neon tube; and (3) the voltage applied across the relaxation oscillator circuit. The latter factor is made use of in operating the relaxation oscillator as an indicator since the amount by which the voltage across the relaxation oscillator circuit exceeds the ignition voltage of the neon lamp determines the frequency at which the neon tube lights.

It is to be noted that the relaxation oscillator is particularly advantageous as a null indicator because the only critical factor affecting the null indication is the ignition voltage of the gas tube. Since the circuit operates to extinguish the gas tube periodically the extinction voltage of the gas tube is of no concern in determining the null indication. If the voltage supplied to the gas tube is above the value required to cause ignition then the gas tube will flash; if the voltage supplied is below the ignition value then the gas will not light at all. There is no electrical leeway between the condition of flashing and the condition of not flashing. Therefore, the present null indicator has the advantage of extreme precision because the null point is determined solely by reference to the ignition voltage of the gas tube.

The buffer resistor 44a, which has a resistance of about 1500 ohms, limits the instantaneous current through neon tube 44 at the instant that the tube fires to a peak value of about 3 or 4 milliamperes. This increases the life of the neon tube by preventing excessive deterioration of the cathode, which would result from a current surge of considerably higher value in the absence of the buffer resistor.

In the operation of my novel indicator with the already described pH measuring apparatus, the difference potential between slide wire 21 and the test cell is applied across the control grid of the first tube 27 and return lead 28 of the amplifier. When the slider 21 is adjusted at the proper position on the potentiometer for the glass electrode in the test cell this potential difference is zero, or null. Under these conditions the amplifier will have been preadjusted, by means presently to be described, so that the voltage supplied by the second stage of the amplifier to the relaxation oscillator will have a value just equal to the ignition voltage of the neon tube. If the slider 21 is positioned so that there is a difference potential between the test cell and the slider there will be a corresponding control grid voltage on the first tube which will appear in amplified form as a change in the output voltage of the second amplifier tube 35. Thus, assuming that this potential has driven the grid on the first tube more positive, the plate voltage of the second tube will rise and therefore will cause the capacitor potential to exceed the ignition voltage of the neon tube. In general, the neon tube will flash at a rate depending upon how far off balance the potentiometer slider 21 is, so as to indicate to the operator of the measuring apparatus that the slider is not positioned at the null point. It is to be noted that the frequency at which the neon tube lights does not increase in unlimited fashion as the potentiometer becomes progressively more unbalanced, since after a certain degree of unbalance in the measuring apparatus the saturation point of the second amplifier tube 35 will have been reached, so that further increase in the potential applied to the grid of the first amplifier tube will not result in an increase in the plate current of the second tube.

If, on the other hand, the slider 21 on the potentiometer is adjusted so as to drive the control grid of the first amplifier tube more negative, this will result in an output voltage of the second amplifier tube which is less than the ignition voltage of the neon tube indicator 44. As a result the neon tube will not light at all.

Between these extremes, the proper null point at which to set the slider 21 on the potentiometer is the point at which the neon tube 44 just lights. Under these conditions the neon tube will flash very slowly, and the sensitivity of the amplifier is so great that essentially the same null point will be established whether the lamp flashes one or two or three times a second.

Preliminary balancing of the instrument may be effected by a single adjustment. It is customary in the art to standardize the pH instrument on a buffer of known pH, such as a buffer of 4.1 pH. In accordance with this procedure, the glass electrode 12 and the reference electrode 13 are immersed in this buffer and the slider 21 on the potentiometer set at 4.1. If the glass electrode has an asymmetry potential, it is then necessary to adjust the asymmetry potential control so that balance is achieved. This is effected by adjusting the position of slider 47, which is connected to the McClure ground, on resistor 25 until the neon indicator just lights at a very slow rate. Obviously this adjustment of the asymmetry potential control changes the input potential to the first stage of the amplifier, which in turn changes the output voltage of the second stage of the amplifier. Consequently this single adjustment of the asymmetry potential, which in any event must be done, also establishes the proper plate voltage on the second tube of the amplifier for a proper null indication.

It will be seen that the present invention embodies an indicator which is at all times simultaneously coupled to the test cell and to the potentiometer, so as to continuously indicate any difference potential therebetween. There is no necessity to switch back and forth between the test cell and the potentiometer for comparing the respective potentials, since a continuous comparison is provided.

Likewise, because of the novel indicator employed in the present invention there is no need of switching the glass electrode between buffers or between solutions, since there is no danger of damaging the indicator, which might happen if the indicator were in the form of a meter having a moving pointer.

Another aspect of the present invention is concerned with the mounting for the indicator tube. I prefer to mount the neon tube closely adjacent potentiometer 14 in a manner such that the operator, while he is adjusting the potentiometer, cannot help but notice the condition of the indicator. As shown in Fig. 3, the potentiometer 14 may take the form of a resistance wire wound around a dielectric annular supporting member 48. The slider 21 takes the form of a spring metal finger engageable with a portion of the resistance wire and rotatable by a shaft 49 actuated manually by knob 50. A circular dial 51, which may be calibrated in increments of pH, is also carried by shaft 49 to move past a fixed hair-line 52 positioned on a transparent cover 53. Thus, the portion of the scale on dial 51 which registers with hair-line 52 is determined by the position of slider 21 on the resistance wire forming the potentiometer 14. The neon tube 44 is fixedly positioned below the cover 53 closely adjacent the rotary dial 51, preferably with its electrodes extending coplanar therewith, so that the neon tube is in focus to the operator at the same time as the potentiometer dial. With this arrangement, the operator's eyes may be at all times directed toward the potentiometer dial and he is not required to divert his gaze therefrom in order to note the condition of the indicator.

In the embodiment of the present invention illustrated in Figures 4–6 additional refinements are provided which even further facilitate the operator's use of the instrument. In that embodiment the amplifier and the indicator portions of the device are identical with those described in connection with Figures 1–3 and operate in the identical manner. The refinements reside in the measuring portion of the instrument.

Whereas in the previously described embodiment of the invention there is provided an electrical adjustment for asymmetry potential, in the form of a slider 47 on resistor 25, the embodiment of Figures 4–6 incorporates a mechanical adjustment for asymmetry potential. As shown in Figures 4–6, the reference electrode 13 of the test cell is connected to a slider 54 which is adjustable along potentiometer 55. Potentiometer 55 is supplied through normally closed switch 56 and resistor 57 with a voltage from battery 58. Resistor 57 is preferably variable, by means of an adjustable slider 59, for a purpose to be described. Resistors 60 and 61 form a series combination connected across battery 58 and switch 56, with the juncture of resistors 60 and 61 being connected to the McClure ground and to lead 28. In this circuit of the measuring apparatus the following values of the circuit elements have been used with success: potentiometer 55 has a total resistance of 1000 ohms, battery 58 has a voltage of 1.35 volts, resistor 57 has a total resistance of about 300 ohms, resistor 60 has a resistance of 5600 ohms, and resistor 61 has a resistance of 700 ohms.

As best seen in Figure 6, the potentiometer slider 54 is in the form of a spring metal finger engageable with a portion of the resistance wire which forms potentiometer 55. The slider 54 is carried on a shaft 62 which is actuated manually by a knob 63 rigid therewith. A suitable dielectric washer 64 may be interposed between shaft 62 and slider 54 to insulate the shaft from the slider. A circular dial 65, which may be calibrated in increments of pH, is positioned on shaft 62 to normally rotate therewith. A transverse friction collar 66 is affixed to shaft 62 and normally abuts against the rear face of dial 65. A metallic spring washer 67 is resiliently stressed between the front face of dial 65 and a collar 68 carried by shaft 62 so as to urge the dial into frictional engagement with collar 66. A stop 69 is fixedly positioned adjacent the back face of dial 65 in slightly spaced relation therefrom when the dial occupies its normal position. A clamp button 70 extends through the front cover 71 of the casing in which the dial is positioned and is normally spring pressed, by a compression spring 73 acting between the front face of cover 71 and a shoulder 74a on the button, to a position away from engagement with the front face of dial 65. A rear annular transverse shoulder 74 normally bears against the back face of panel 71 to hold button 70 in assembled relation thereon. When it is desired to adjust the position of dial 65 with respect to shaft 62 (and thus to adjust the position of dial 65 relative to potentiometer slider 54) the button 70 is pushed inwardly to press against dial 65 and hold the same against stop 69. While the dial 65 is thus frictionally held against rotation shaft 62 is rotated by turning knob 63. During this adjustment the frictional driving connection between the dial 65 and collar 68 is overcome by the retarding force exerted by pressing button 70 against the dial. An arcuate slot 75 formed in dial 65 and a protruding pin 76 on collar 66 which extends into this slot cooperate to limit the relative adjustment between shaft 62 and dial 65.

To accomplish the asymmetry potential adjustment in the measuring portion of this apparatus it is only necessary to make the above-described mechanical adjustment of the dial 65 with respect to shaft 62. Such adjustment changes the relationship between the voltage at slider 54, which is determined by its position on the potentiometer, and the reading of dial 65 for that position of the slider. Thus, to effect this asymmetry potential adjustment the glass electrode 12 and the reference electrode 13 are immersed in a buffer of known pH. The shaft 62 is rotated until the dial 65 is positioned to align the dial pH reading corresponding to the known pH value of the buffer solution under the hair-line 77 formed on a transparent window 78 in the front panel 71. Clamp button 70 is then depressed to hold dial 65 in fixed position with respect to hairline 77 while the shaft 62 is rotated further to adjust slider 54 along potentiometer 55 until the neon lamp 44 indicates that the null condition has been reached. Then the clamp button 70 is released. The dial 65 still reads the correct pH value for the known solution, and the asymmetry potential due to the glass electrode has been compensated for by the adjustment of the potentiometer slider. Thereafter in the use of this potentiometer with this particular cell chain there is no further adjustment of dial 65 relative to potentiometer slider 54 required.

As in the embodiment of Figures 1–3, the neon tube 44 in this form of the invention is also fixedly positioned behind the front panel 71 adjacent the dial 65, preferably with its electrodes extending coplanar with dial 65 in a position such that the operator when looking at the dial will at the same time notice the condition of flashing of the neon tube.

By virtue of this novel arrangement there is provided a unique single control for compensating for asymmetry potential and preliminarily adjusting the amplifier to the null condition, along with the potentiometer adjustment. All these adjustments are located on a single shaft controlled by a single control knob.

A manual control for the instrument to compensate for the temperature of the liquid being tested is provided by making resistor 57 adjustable. Preferably resistor 57 is a wire wound rheostat. As the position of slider 59 on this resistor is changed it thereby varies the total voltage drop across potentiometer 55, so as to control the slope of the voltage versus pH reading curve of the potentiometer 55. Thus, as the temperature rises slider 59 should be adjusted to supply a greater voltage across the ends of potentiometer 55 to correspond to the pH change in the liquid due to the temperature rise, in accordance with the usual pH versus temperature relationship. Thereby the voltage at potentiometer slider 54 will be adjusted to accurately represent the actual pH of the test solution. Resistor 57 is preferably calibrated in terms of temperature, from 0 to 100 degrees centigrade. The calibration scale would be approximately, but not exactly, linear.

While there have been described specific preferred embodiments of the present invention it is to be understood that various changes may be resorted to in the particular application of the invention which do not depart from the spirit thereof, and it is intended to cover all such variations which fall within the scope of the present invention.

I claim:

1. In an ion activity measurement device, an electrolytic cell chain for producing a voltage proportional to an electro-chemical characteristic of a test sample, adjustable means for balancing a voltage against the output of said cell chain, an indicator responsive to the condition of voltage balance between said cell chain and said adjustable voltage means, means normally controlled by said adjustable means and calibrated to indicate the electro-chemical characteristic of the test sample corresponding to the opposing voltage produced by said adjustable means, and means for effecting relative adjustment between said adjustable voltage means and said calibrated means to compensate for an error voltage in the output voltage of said cell chain.

2. The combination in an ion activity measurement device of an electrolytic cell chain for producing a potential proportional to a characteristic of a test sample, adjustable means for balancing a known potential against the output of said cell chain, said adjustable potential means including a potentiometer and a rotary, manually actuated shaft controlling the position of a tap adjustable along the potentiometer, an amplifier, means for coupling said amplifier to the output of said cell chain and said adjustable potential means to apply the difference potential therebetween to the input of said amplifier, a null indicator coupled to the output of said amplifier, said indicator comprising a relaxation oscillator including a gas tube responsive to the D. C. output voltage of said amplifier, a calibrated dial carried by said potentiometer shaft and normally movable therewith to indicate the characteristic of the test sample corresponding to the balance voltage produced by said adjustable potential means, and means for moving said shaft to change the voltage at the adjustable tap on the potentiometer while holding said dial in fixed position to compensate for the asymmetry potential in said cell chain and to initially adjust the input to the amplifier to establish the null condition of the null indicator.

3. A pH meter comprising an electrolytic cell chain for producing a voltage proportional to the hydrogen ion concentration of a test sample, means for balancing a known voltage against the output of said cell chain, an amplifier coupled to the output of said cell chain and balance voltage means to respond to the difference voltage therebetween, a null indicator coupled to the output of said amplifier comprising a relaxation oscillator including a glow tube operative to indicate by its condition and frequency of flashing the amplitude of the output voltage of the amplifier, and a single manual control operative to adjust the voltage of said balance voltage means and to compensate for the asymmetry potential in the cell chain and to initially adjust the input to the amplifier to establish the null condition of the null indicator.

4. In an ion activity measuring device having an electrolytic cell chain for producing a voltage proportional to an electro-chemical characteristic of a test sample, adjustable means for balancing a known potential against the output of said cell chain, said adjustable voltage means comprising a potentiometer and a mercury cell battery having a constant output voltage connected to the potentiometer to produce a voltage drop thereacross, and means for compensating for a change in the electrochemical characteristic of the test sample resulting from a temperature change thereof, said last-mentioned means consisting of a variable resistance calibrated in terms of temperature and connected in series between the potentiometer and the battery therefor to vary the total voltage drop across the potentiometer in accordance with the change in the voltage of the cell chain with changes in temperature of the test sample.

5. In an ion activity measurement device, an electrolytic cell chain for producing a voltage proportional to an electro-chemical characteristic of a test sample, means for adjusting the amplitude of a voltage for balancing said adjustable voltage against the output of said cell chain, a calibrated dial coupled to said adjustment means for indicating the setting thereof, an amplifier, means for continuously coupling said amplifier to the output of said cell chain and said adjustable voltage means to apply the difference voltage therebetween to the input of said amplifier, an indicator electrically coupled to the output of said amplifier, said indicator comprising a relaxation oscillator including a neon tube responsive to the condition of voltage balance between said cell chain and said adjustable voltage means to indicate by its condition and frequency of illumination the magnitude of said difference voltage, means for mounting said neon tube adjacent an edge of said calibrated dial co-planar therewith for visual observation of said neon tube by the operator while setting said calibrated dial, and means for initially adjusting said amplifier to supply a voltage to the neon tube equal to the ignition voltage thereof in the absence of a difference voltage input to the amplifier from said cell chain and said adjustable voltage means.

6. An apparatus for indicating a null condition in the voltage applied thereto comprising a relaxation oscillator circuit including a glow tube adapted to be periodically ignited and extinguished when a voltage is applied to the oscillator circuit at a rate correlative with the amount by which the applied voltage exceeds the ignition voltage of the tube, means for applying a voltage to said tube equal to the ignition voltage of the tube when the voltage to be indicated is zero, said means including a direct connected amplifier, a first circuit means for connecting the voltage to be indicated to the input of said amplifier, a second circuit means for connecting the oscillator circuit to the output of the amplifier, and means in said first circuit means for applying a bias to the input of said amplifier such that the output voltage applied to the oscillator circuit equals the ignition voltage of the glow tube when the voltage to be indicated is zero whereby the glow tube is operative to indicate by its condition and frequency of illumination the deviation of the voltage to be indicated from zero.

7. In a null type device for measuring the voltage output of a direct current voltage source of small magnitude, calibrated voltage balancing means for applying a direct current voltage in opposition to the output of said voltage source, a relaxation oscillator circuit including a glow tube adapted, when a voltage above the ignition voltage of the tube is applied to the oscillator circuit, to be periodically ignited and extinguished at a rate correlative with the amount by which the applied voltage exceeds said ignition voltage to thereby provide a visual indication of the voltage supplied to the oscillator circuit, a direct connected amplifier, circuit means for connecting said voltage source and said calibrated means to the input of said amplifier to apply the difference voltage between the voltage source and the balancing means to said amplifier, circuit means connecting the oscillator circuit to the output of said amplifier, and means including said amplifier for applying a voltage to said oscillator circuit equal to said ignition voltage when the potential difference between said source and said balancing means is zero whereby said glow tube is operative to indicate by its condition and frequency of illumination any deviation from the null condition of potential balance between said source and said balancing means.

8. In a null type device for measuring the voltage output of a direct current voltage source of small magnitude, calibrated voltage balancing means for applying a direct current voltage in opposition to the output of said voltage source, a relaxation oscillator circuit including a glow tube adapted to be periodically ignited and extinguished when a voltage above the ignition voltage of the gas tube is applied to the oscillator circuit and at a rate correlative with the amount by which the applied voltage exceeds said ignition voltage to thereby provide a visual indication of the voltage applied to said oscillator circuit, means for applying a voltage to said oscillator circuit equal to said ignition voltage when the difference voltage between said source and said balancing means is zero, said means for applying voltage to said oscillator circuit including: a direct connected amplifier, a first circuit means connecting the input of said amplifier to said voltage source and to said balancing means to apply the difference voltage therebetween to said amplifier, a second circuit means connecting the output of said amplifier to oscillator circuit, and means in said first circuit means for applying a bias to the input of said amplifier such that the output voltage of the amplifier applied to the oscillator circuit equals said ignition voltage of the glow tube when the voltage input to the amplifier from said balancing means and said source is zero.

9. In an ion activity measuring device, an electrolytic cell chain for producing an output voltage including a voltage to be measured which is proportional to an electro-chemical characteristic of a test sample, calibrated means for balancing an adjustable voltage against the output of said cell chain, an indicator comprising a relaxation oscillator circuit including a glow tube adapted to be periodically ignited and extinguished at a rate correlative with the amount by which the voltage applied to the circuit exceeds the ignition voltage of the tube, means for applying a voltage to said circuit equal to the ignition voltage of the tube when the voltage of the calibrated means balances said voltage to be measured, said means including a direct connected amplifier, a first circuit means for connecting said calibrated means and said cell chain to the input of the amplifier, a second circuit means for connecting said oscillator circuit to the output of the amplifier, and single manually adjustable means in said first circuit means for applying a voltage in opposition to the asymmetry potential of the cell chain and for adjusting the bias applied to the input of said amplifier such that the output voltage of the amplifier applied to the oscillator circuit equals the ignition voltage of the glow tube when the difference between said voltage to be measured and the voltage of the balancing means is zero.

10. In a null type measuring device for measuring the voltage output of a direct current source of small magnitude, a relaxation oscillator circuit including a glow tube adapted, when a voltage above the ignition voltage is applied to the circuit, to be periodically ignited and extinguished at a rate correlative with the amount by which the applied voltage exceeds the ignition voltage, a direct connected amplifier having the output thereof connected to said oscillator circuit, circuit means for connecting said voltage source to the input of said amplifier and including means having a single manual control operative to apply a voltage in opposition to the voltage of said source to balance the latter and to adjust the output voltage of the amplifier applied to said oscillator circuit to equal the ignition voltage of the glow tube when the source voltage is balanced and thereby establish a null condition in the measuring device, said single control including a potentiometer having a wiper means for applying a preselected voltage to said potentiometer, a calibrated dial member, an indicator member cooperable with said dial member, means including a friction clutch operatively connecting one of said members to said wiper whereby said one of said members and wiper normally move together, and means for moving the wiper while holding said one of said members in a fixed position when said dial member and said indicator member are positioned to indicate a voltage equal to the voltage of said source whereby the wiper may be adjusted to apply an input bias to the amplifier to establish the null condition of the measuring device.

11. A pH meter comprising an electrolytic cell chain for producing an output voltage including a voltage to be measured which is proportioned to the hydrogen ion concentration of the test sample, a relaxation oscillator circuit including a glow tube adapted, when a voltage is applied to the circuit equal to the ignition voltage of the tube, to be periodically ignited and extinguished at a rate correlative with the amount by which the applied voltage exceeds the ignition voltage, an amplifier having the output thereof connected to said oscillator circuit, circuit means for connecting said cell chain to the input of said amplifier and including means having a single manual control operative to apply a voltage in opposition to the voltage to be measured to balance the latter and to apply a voltage to the cell chain for compensating for the asymmetry potential of the cell chain and to adjust the output voltage of said amplifier applied to the oscillator circuit to equal the ignition voltage of the glow tube when the cell output voltage is balanced to thereby establish a null condition in the meter, said single control including a potentiometer having a wiper, means for applying a voltage to said potentiometer, a calibrated dial member, an indicator member cooperable with said dial member, one of said members being connected to said wiper and normally movable therewith, and means for holding said one of said members, when said members are adjusted relative to each other to indicate a voltage equal to the voltage to be measured, whereby the wiper may be moved relative to said one of said members to apply a potential to the cell chain to compensate for the asymmetry potential thereof and to adjust the bias applied to the input of the amplifier to establish the null condition of the meter.

12. The combination of claim 9 wherein said calibrated means includes a potentiometer, a mercury cell battery for applying a constant voltage to said potentiometer, a variable resistor in series with said mercury cell battery and potentiometer, and calibrated means for varying the current flow through said potentiometer to vary the voltage drop across the potentiometer in accordance with the change in the output voltage of the electrolytic cell with changes in temperature.

References Cited in the file of this patent

UNITED STATES PATENTS

| | | |
|---|---|---|
| 1,873,879 | Graham | Aug. 23, 1932 |
| 2,186,727 | Martin et al. | Jan. 9, 1940 |
| 2,192,777 | Smith | Mar. 5, 1940 |
| 2,232,211 | Cary | Feb. 18, 1941 |
| 2,259,792 | Batcheller | Oct. 21, 1941 |
| 2,266,516 | Russel | Dec. 16, 1941 |
| 2,285,482 | Wunsch | June 9, 1942 |
| 2,312,945 | Williams | Mar. 2, 1943 |
| 2,367,746 | Williams | Jan. 23, 1945 |
| 2,416,949 | Perley et al. | Mar. 4, 1947 |
| 2,434,297 | Test et al. | Jan. 13, 1948 |
| 2,457,920 | Rider | Jan. 4, 1949 |
| 2,459,730 | Williams | Jan. 18, 1949 |
| 2,511,888 | Weingarten | June 20, 1950 |

FOREIGN PATENTS

| | | |
|---|---|---|
| 150,902 | Austria | May 15, 1937 |
| 716,235 | Germany | Jan. 15, 1942 |
| 720,647 | Germany | May 12, 1942 |